United States Patent [19]

Brown, Jr.

[11] Patent Number: 5,011,238

[45] Date of Patent: Apr. 30, 1991

[54] MASTER CYLINDER WITH INTEGRATED ADAPTIVE BRAKING AND TRACTION CONTROL SYSTEM

[75] Inventor: Arthur K. Brown, Jr., South Bend, Ind.

[73] Assignee: Allied-Signal Inc., Morristown, N.J.

[21] Appl. No.: 497,954

[22] Filed: Mar. 19, 1990

[51] Int. Cl.⁵ .............................................. B60T 8/32
[52] U.S. Cl. ................................... 303/116; 303/110; 303/119
[58] Field of Search ............... 303/110, 113, 116, 119, 303/114, 115, 50; 180/197

[56] References Cited

U.S. PATENT DOCUMENTS

| | | | |
|---|---|---|---|
| 4,636,009 | 1/1987 | Tsuru et al. | 303/116 X |
| 4,685,747 | 8/1987 | Belart et al. | 303/119 X |
| 4,705,324 | 11/1987 | Kervagoret | 303/119 |
| 4,778,226 | 10/1988 | Brown | 303/116 |
| 4,796,958 | 1/1989 | Brown, Jr. | 303/50 X |
| 4,838,620 | 6/1989 | Sypniewski | 303/116 |
| 4,953,918 | 9/1990 | Hashida et al. | 303/116 X |

Primary Examiner—Douglas C. Butler
Attorney, Agent, or Firm—Larry J. Palguta; Ken C. Decker

[57] ABSTRACT

The integrated adaptive braking and traction control system assembly (10) comprises an elongated body (12) having a bore (16) with a master cylinder mechanism (18) disposed therein. The body (12) includes a plurality of valve devices (26) for adaptive braking and traction control, a plurality of passages which connect the master cylinder mechanism (18) with the valve devices (26) and selected valve devices with other selected valve devices, a four-channel pump mechanism (90) for communicating fluid pressure toward associated wheel brakes (52, 62, 72, 82) of the vehicle, displacement chambers (42A, 42B, 42C, 42D) with displacement pistons (43) disposed therein, and a reservoir (40) which communicates with the master cylinder mechanism (40) and adaptive braking and traction control systems.

22 Claims, 4 Drawing Sheets

MASTER CYLINDER WITH INTEGRATED ADAPTIVE BRAKING AND TRACTION CONTROL SYSTEM

The present invention relates generally to an integrated adaptive braking and traction control system and assembly, and in particular to an integrated assembly which may be mounted directly to a booster mechanism in order to add the adaptive braking and traction control functions to a vehicle.

Anti-lock or adaptive braking systems are now well-known. Broadly, these systems incorporate an electronic circuit including a microprocessor based computational circuit connected to the wheels of a motor vehicle via one or more wheel speed sensors. Rotational behavior of the wheels, particularly during braking, is analyzed through the medium of appropriate algorithms to sense an imminent wheel lock or skid condition. When such a condition is sensed, the adaptive braking system automatically assumes control of the vehicle braking to modulate the application of braking forces to effect maximum vehicle braking and prevent locking of the wheels. Traction control systems are also well-known. Broadly, these systems utilize essentially the same components of the adaptive braking system but for effecting the opposite result. When the system analyzes the rotational behavior of the drive wheels and determines during acceleration that the wheels are beginning to slip relative to the road system, the traction control system automatically assumes control of the vehicle braking system to modulate the application of braking forces to effect operation of the vehicle brakes and prevent the drive wheels from slipping. In adaptive braking the system keeps the vehicle wheels rotating and prevents them from locking up; in traction control the system modulates braking pressure to keep the vehicle drive wheels from spinning relative to the road surface during acceleration.

In the practical implementation of adaptive and traction control systems, a significant number of elements must be incorporated. For example, the system must include a dual circuit master cylinder, means for providing a power assist to the master cylinder such as a hydraulic booster or a vacuum booster, a plurality of high-speed solenoid actuated valves, check valves where needed, and other devices according to the respective system. Because of the limited space available in contemporary engine compartments and the necessity of minimizing hydraulic line length and connections, and the need to provide a system that can be conveniently mounted in a variety of vehicles, it is necessary to provide a compact, low cost, and efficient integrated system incorporating all of the required components for an adaptive and traction control system. An integrated adaptive braking system is disclosed in Brown, Jr. U.S. Pat. No. 4,796,958 entitled "Integrated Anti-Lock Braking System." However, there continues to be a need for a compact, efficient, and cost effective integrated adaptive braking and traction control system and assembly.

The present invention comprises an integrated adaptive braking and traction control system assembly, comprising an elongated body having a mounting end and an axial bore extending from said mounting end, a master cylinder assembly operatively disposed in said bore, the elongated body including a plurality of valve devices for the adaptive braking and traction control system, a plurality of passages connecting the master cylinder with the valve devices and selected valve devices with other selected valve devices, pump means disposed adjacent the mounting end and for communicating pressure toward wheels of an associated vehicle, a plurality of displacement chambers with displacement pistons disposed therein and communicating with selected ones of said passages, and reservoir means connected with said master cylinder and said adaptive braking and traction control system, to provide the integrated adaptive braking and traction control system assembly for mounting in a vehicle.

One way of carrying out the invention is described in detail below with reference to the drawings which illustrate an embodiment in which.

Figure 1:
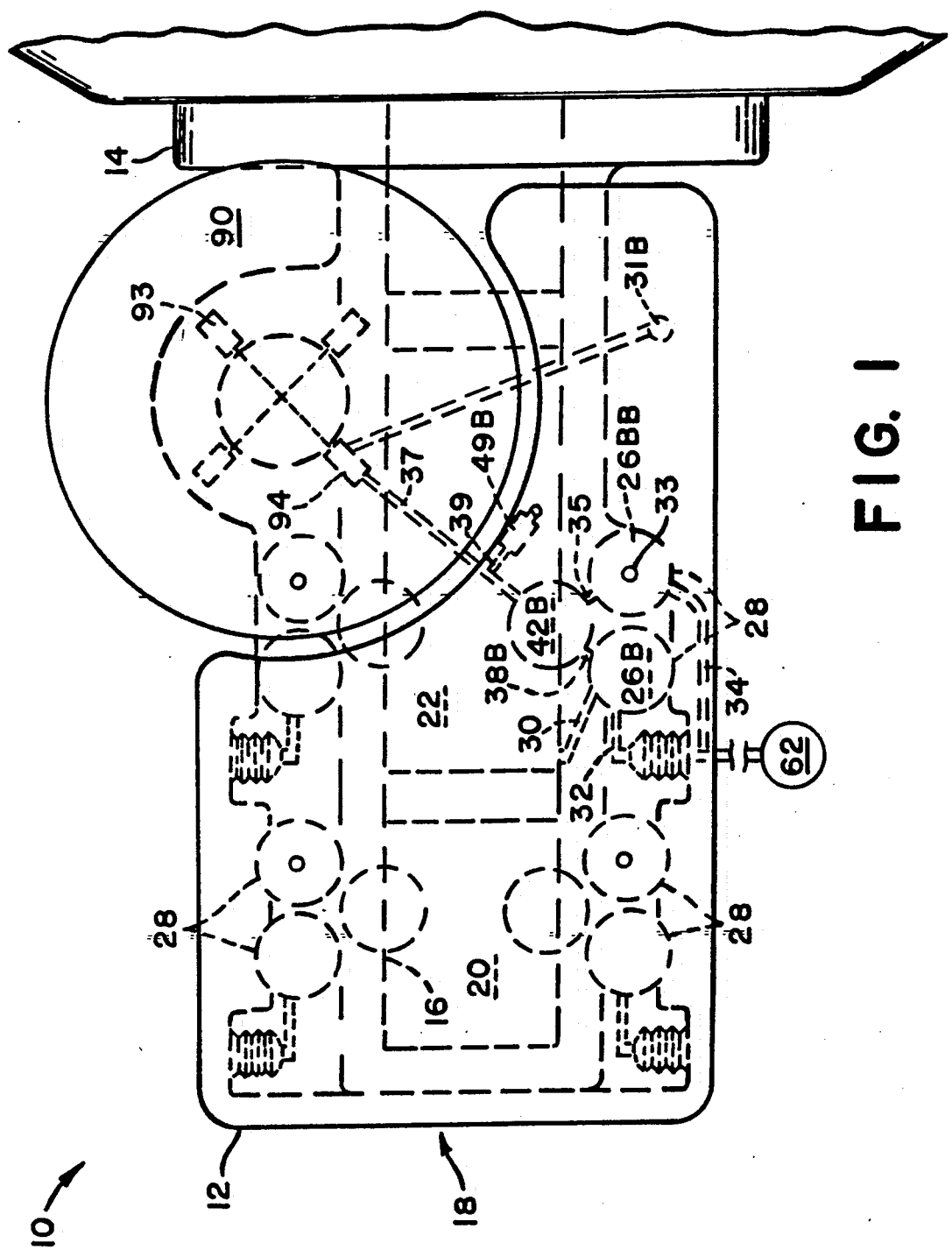
FIG. 1 is a top schematic view in partial detail of the integrated adaptive braking and traction control system assembly in accordance with the present invention.
Figure 2:
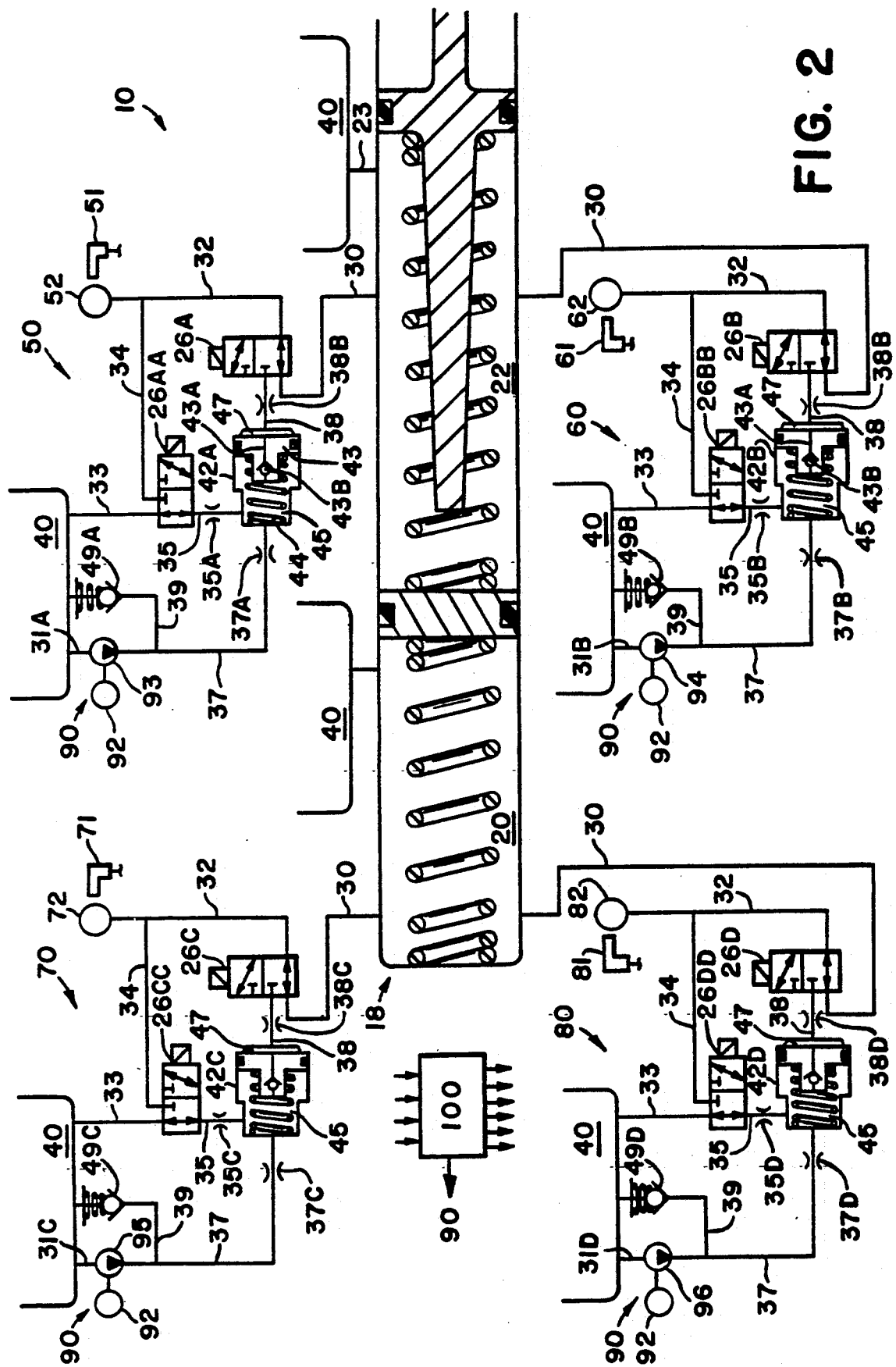
FIG. 2 is a schematic representation of the integrated adaptive braking and traction control system assembly including its connections with respective wheel brakes.

The integrated adaptive braking and traction control system assembly is designated generally by reference numeral 10 in FIG. 1. Assembly 10 comprises an elongated body 12 having a mounting end 14 for mounting to the front of either a vacuum booster 11 or a hydraulic booster assembly 13 (each schematically illustrated in FIG. 1). Body 12 includes an interior bore 16 which houses a master cylinder assembly designated generally by reference numeral 18. Master cylinder assembly 18 comprises a dual chamber master cylinder assembly (see FIG. 2) with each pressure chamber communicating with a respective set of vehicle wheel brakes. The master cylinder chambers 20, 22 may communicate with the vehicle wheel brakes as illustrated in FIG. 2 which discloses a verticle braking system, or chambers 20, 22 may communicate with the wheel brakes via a cross-split system. In a cross-split system, chamber 20 may communicate with the left front wheel brake and the right rear wheel brake while chamber 22 communicates with the right front wheel brake and the left rear wheel brake. The braking system configuration utilized may vary according to the particular vehicle application.

In FIG. 1, body 12 includes a plurality of valve housing passages 28 which house valve devices 26. FIG. 1 illustrates in detail the components of one braking circuit and their communication with the respective wheel brake. As illustrated in FIG. 2, the braking circuit for each wheel is the same; therefore, only one circuit is illustrated in FIG. 1. Body 12 further includes a plurality of passages 30 which communicate the master cylinder chambers with the respective wheel brake circuits, and passages or lines which communicate components of the braking circuits with each other, the respective wheel brake, and a master cylinder reservoir 40. The master cylinder reservoir typically is disposed above body 12 and therefore is not shown in FIG. 1. The detailed portion of FIG. 1 is discussed below.

Referring to FIG. 2, there is illustrated schematically the adaptive braking and traction control system assembly, the respective wheel brake circuits, circuit components, and master cylinder reservoir and pistons of the present invention. It should be clearly understood that while the reservoir 40 and pump 90 are shown separately in each circuit, these items are each but one item of structure and each provides the same function for each of the circuits. Each of the wheel brake circuits 50, 60, 70, and 80 comprises the same circuit configuration; all of the circuits are illustrated in order to provide a clear understanding of the entire system. Wheel brake circuit 50 comprises a passage 30 connected with master cylinder chamber 22 and with an isolation-decay solenoid valve 26A. Valve 26A communicates via passage or line 32 with the right front wheel brake 52. The master cylinder reservoir which communicates with chamber 22 via compensation passage 23, also communicates via a passage or line 33 with a build solenoid valve 26AA. Build solenoid valve 26AA also communicates with the right front wheel brake 52 via line or passage 34 and with a displacement piston and chamber via line 35. The displacement chamber 42A includes a displacement piston 43 biased by a displacement spring 44. Chamber 42A is divided by piston 43 into chamber 45 and chamber 47. Piston 43 of Chamber 42A includes a through passage 43A having therein a one way flow valve or check valve 43B. Chamber 47 communicates via line or passage connection 38 with the isolation-decay solenoid valve 26A. The assembly 10 includes a pump 90 which comprises a pump motor 92 that operates four pistons, one for each braking circuit 50, 60, 70, and 80. Pump motor 92 receives fluid from reservoir 40 via line 31A and operates piston 93 to provide pressure via line or passage 37 to displacement chamber 45 of circuit 50. Lines 35, 37, and 38 each include respective orifice passages 35A, 37A, and 38A in order to restrict fluid flow therethrough. Piston 93 also communicates fluid pressure to line or passage 39 which connects with master cylinder reservoir 40 via a pressure relief valve 49A.

Wheel brake circuit 60 comprises the same basic circuit configuration as wheel brake circuits 50, 70 and 80 but is associated with the left front wheel brake 62. Wheel brake circuit 60 includes associated lines or passages 32, 33, 34, 35, 37, 38, 39, restrictions 35B, 37B, 38B, isolation-decay solenoid valve 26B, build solenoid valve 26BB, pressure relief valve 49B, and a portion of the pump 90 comprising the piston 94. Likewise, wheel brake circuits 70 and 80 for right rear wheel brake 72 and left rear wheel brake 82 contain the respective components and passages associated therewith.

Referring to FIG. 1, the wheel brake circuit 60 will be described in detail in order to provide an illustration of how the circuit is disposed within the assembly 10. It should be clearly understood that while only wheel brake circuit 60 is described in detail, the other wheel brake circuits 50, 70 and 80 are essentially identical and are disposed in the same manner within assembly 10. FIG. 1 illustrates a practical embodiment of the schematic illustration of wheel brake circuit 60 of FIG. 2. In FIG. 1, the outlet line or passage 30 from master cylinder chamber 22 is shown as being connected to the vertically disposed isolation-decay solenoid valve 26B. The valve housing passages 28 house the solenoid valves 26B and 26BB. Isolation-decay solenoid valve 26B communicates with the left front wheel brake 62 via line 32. The displacement chamber 42B is also vertically oriented and is illustrated with its connection 38B providing communication with isolation-decay solenoid valve 26B. Displacement chamber 42B also communicates via line 35 with the build solenoid valve 26BB. Build solenoid valve 26BB communicates via line 34 with the left front wheel brake 62. The reservoir 40 (not shown in FIG. 1) communicates with the pump 90 via line 31B. Line 31B communicates braking fluid to the piston 94 which then transmits pressurized fluid via line 37 to the displacement chamber 42B. Line 37 also connects with line 39 which transmits fluid pressure to pressure relief check valve 49B that then communicates with the reservoir (not shown). Thus, the schematic illustration of wheel brake circuit 60 illustrated in FIG. 2 is illustrated in a practical embodiment which may be contained within the assembly 10.

Figure 3:
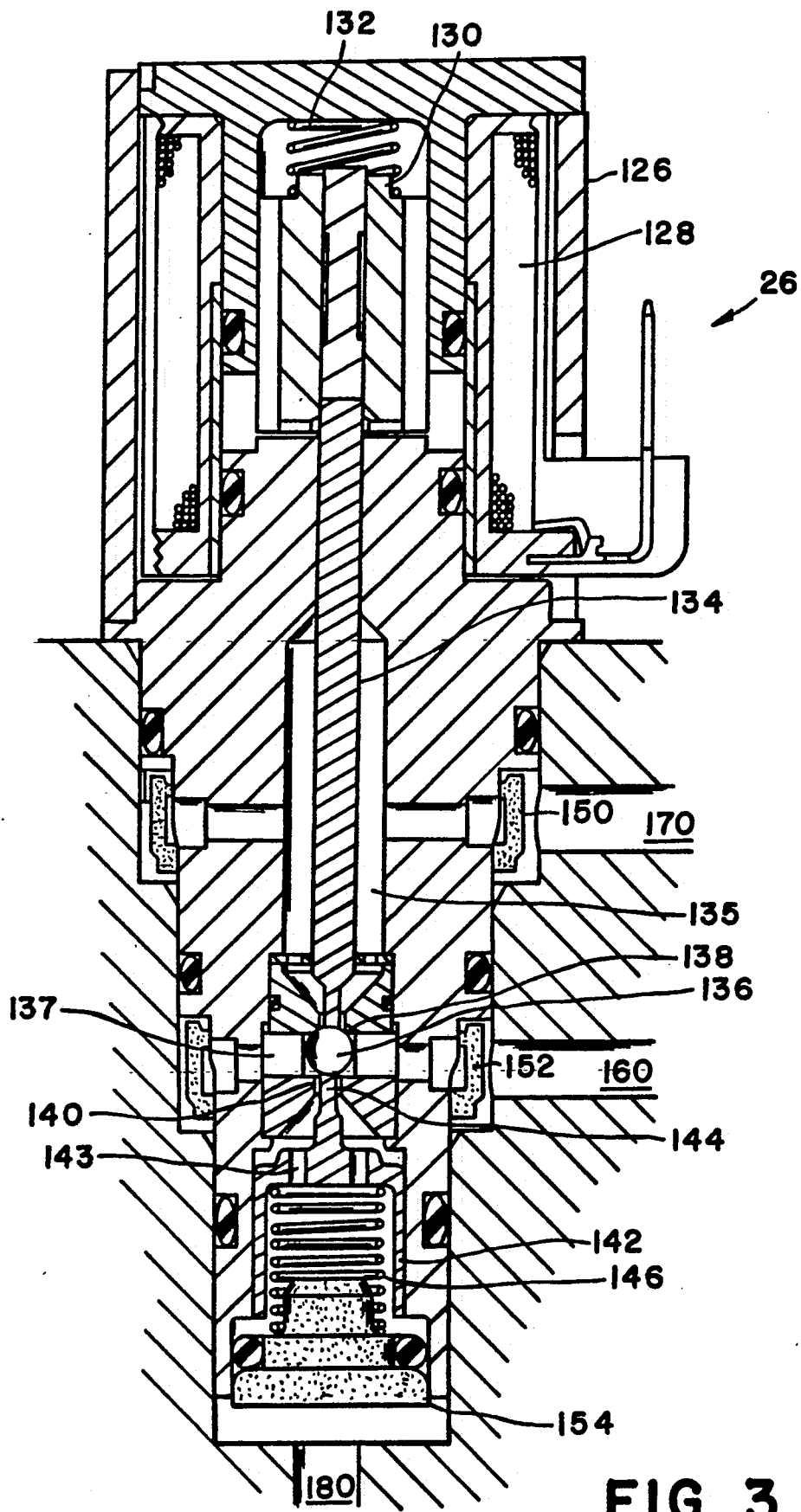
FIG. 3 is a section view of a three-way solenoid valve which may be utilized within the assembly of the present invention.
Figure 4:
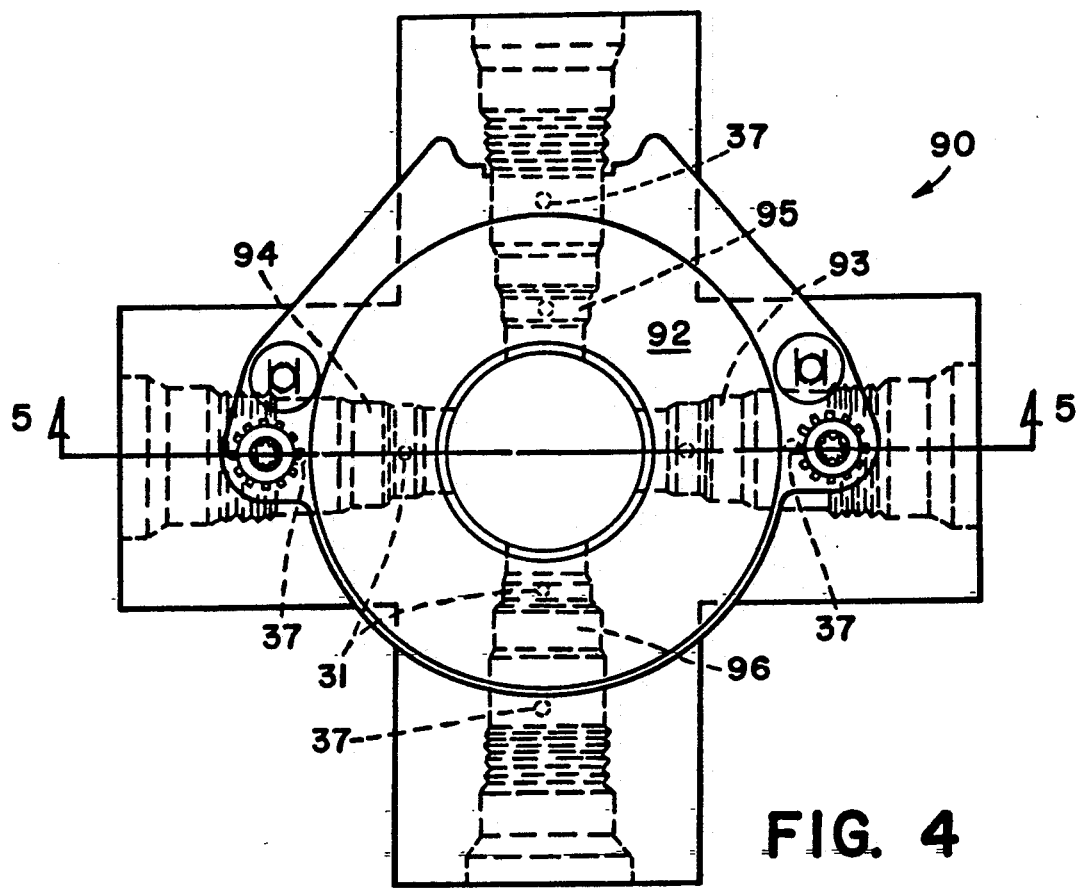
FIG. 4 is an enlarged top view of the pump portion of the assembly illustrated in FIG. 1.
Figure 5:
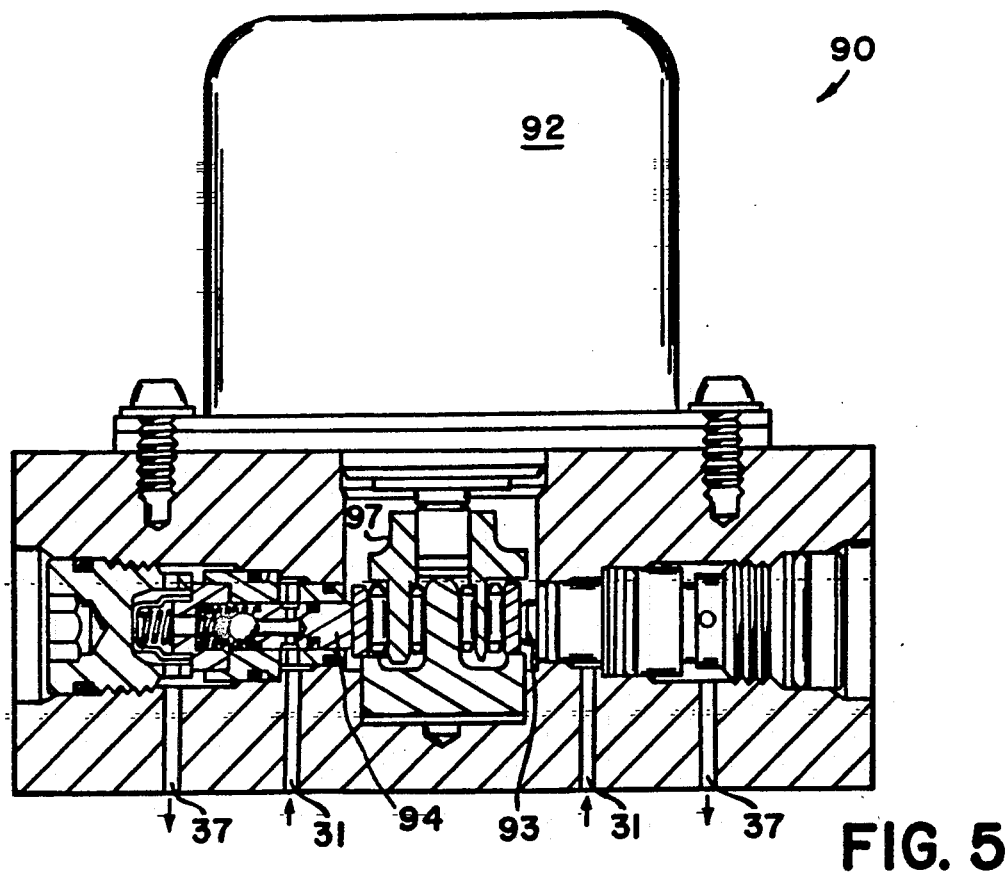
FIG. 5 is a section view of the pump assembly of FIG. 4.

Referring now to FIG. 3, a valve device 26 is illustrated in detail. The valve device 26 comprises a three-way solenoid valve which may be utilized as either an isolation-decay solenoid valve or a build solenoid valve in the assembly and system of the present invention. Valve 26 comprises a housing 126 which includes coil means 128 and an armature 130 biased by spring 132. Armature 130 is connected with valve rod 134 which engages a valve member 136 that normally seats on valve seat 138. Valve member 136 is disposed adjacent a valve seat 140 through which extends extension 144 of positioning member 142 which is biased by spring 146. Annular filters 150 and 152 filter contaminants and particulates from fluid communicated through solenoid 26, as does the filter 154. The inlet 180 permits fluid pressure to communicate with the openings 143 of positioning member 142, through valve seat 140 to chamber 137, through the filter 152 and out the passage 160. When solenoid valve 26 is actuated by energizing coil means 128 so that armature 130 shifts downwardly and causes rod 134 to move valve member 136 from seat 138 and into engagement with valve seat 140, fluid from opening 170 may then pass through interior clearance 135, valve seat 138, and out opening or passage 180 via filter 152. If, for example, solenoid valve 26 of FIG. 3 was utilized as the isolation-decay solenoid valve 26A illustrated in wheel brake circuit 50 of FIG. 2, then the opening or passage 180 would comprise the passage or line 30 which communicates fluid presure from master cylinder chamber 22 to the right front wheel brake 52 via line or passage 32. Line or passage 32 would be, in FIG. 3, the passage or opening 160. When solenoid valve 26A of FIG. 2 is actuated, then the line or passage 160 in FIG. 3 (the line or communication 32 in FIG. 1) would be communicated via open valve seat 138 with the opening or passage 170 (line or passage 38 in FIG. 2). Thus, it is readily apparent that solenoid valve 26 may be utilized as the three-way solenoid valves illustrated in FIG. 2 to effect build, isolation, and decay of braking pressure Referring now to FIG. 4, an enlarged top view of the pump 90 illustrates the connections with the four individual lines 37 that communicate with the chambers 45 of the respective displacement chambers 42A-D. As illustrated in FIGS. 4 and 5, the motor 92 is mounted above the four pistons only two of which 93, 94 are illustrated in FIG. 5. Pump 90 illustrated in FIGS. 4 and 5 comprises essentially the pump disclosed in Joy et al U.S. Pat. No. 4,861,234 entitled *"Low-Noise Pump Assembly"*, assigned to the same Assignee as herein, and incorporated by reference herein. The pump motor drives coupling and eccentric member 97 to cause the pistons 93–96 (FIG. 2) to reciprocate within their respective bores so that fluid received from the reservoir 40 via lines or passages 31A–D is pumped to the (FIG.

2) respective wheel brake circuits via the associated lines 37.

The integrated adaptive braking and traction control system assembly operates as follows for one illustrated wheel brake circuit. For adaptive braking system operation, when the wheel speed sensors 51, 61, 71, and 81 sense a change in the rotational behavior of the wheels, the electronic control unit or microprocessor 100 (FIG. 2) immediately actuates the pump 90. At the same time, the isolation-decay solenoid valve 26A of wheel brake circuit 50 is energized in order to reduce brake pressure by permitting braking fluid pressure to decay via line 32, valve 26A, line 38, and to chamber 47 of displacement chamber 42A. If the volume and pressure of the decayed fluid transmitted to chamber 47 exceeds the pressure in chamber 45, piston 43 may be displaced to enlarge chamber 47 and check valve 43B may open. For building wheel brake pressure, the build solenoid valve 26AA is also energized so that fluid pressure communicated by pump piston 93 via line 37 to chamber 45, line 35, may be communicated with line 34 which communicates with the right front wheel brake 52. Fluid pressure in chamber 45 effects displacement of piston 43 of displacement chamber 42A so that fluid in chamber 47 is communicated via line 38, valve 26A, and line 32 toward right front wheel brake 52 such that brake 52 receives braking pressure via both lines 32 and 34. Master cylinder 18 remains isolated by energized solenoid valve 26A. Control unit 100 then modulates the braking pressure by alternately energizing build solenoid valve 26AA. When adaptive braking system operation terminates, the pump 90 is de-energized and the wheel brake 52 released. For brake release, solenoid 26AA is deenergized so that fluid pressure in lines 33, 35 and 37 is relieved to reservoir 40. Solenoid 26A is denergized so that fluid pressure in line 32 is relieved to the master cylinder 28. The operation of wheel brake circuit 50 has been described in detail, it being clearly understood that the operation of all wheel brake circuits 50, 60, 70 and 80 are identical.

For the traction control system operation, when the wheel speed sensors sense a change in rotational wheel behavior such that the control circuit 100 determines that wheel slippage of a drive wheel is imminent, pump 90 is energized concurrent with the energization of solenoid valves 26A and 26AA. This permits fluid pressure communicated by piston 93 via line 37, chamber 45, line 35, to be communicated via solenoid valve 26AA and line 34 with the right front wheel brake 52. At the same time that build solenoid valve 26AA is energized, isolation-decay solenoid valve 26A is energized so that line 38 is communicated with line 32 whereby fluid pressure buildup within chamber 45 effects displacement of piston 43 so that fluid within chamber 47 is communicated via line 38, valve 26A, and line 32 toward the right front wheel brake 52. Thus, during traction control the right front wheel brake 52 receives braking pressure via both lines 32 and 34. In order to reduce braking pressure at wheel brake 52, both valves 26A and 26AA are de-energized so that fluid pressure in chamber 45 may be communicated to the reservoir 40 via lines 33 and 35, and fluid pressure at wheel brake 52 may be decayed through line 32 and toward master cylinder chamber 22 via line 30. Traction control is continued by alternatively energizing and de-energizing the valves 26A and 26AA. When traction control ceases, pump 90 is de-energized.

If the vehicle has four wheel drive, then all of the circuits 50, 60, 70 and 80 may be operated during traction control. If the vehicle has two wheel drive, then the brake circuits on the appropriate front or rear axle may be operated during traction control.

The integrated adaptive braking and traction control system and assembly of the present invention provides significant advantages over prior systems. Because the adaptive braking and traction control systems are integrated within the assembly of the master cylinder body, the unit as a whole can be utilized on any vehicle by simply changing the master cylinder. The system and assembly provides a displacement type of adaptive braking and traction control system such that the customer or purchaser need only mount the assembly on a vacuum or hydraulic booster and attach the four brake lines. The system enables the utilization of small and inexpensive three-way solenoid valves, and each wheel brake can be controlled independently and have both adaptive braking and traction control utilized therewith. The system and assembly utilize a smaller, less expensive and quieter pump, and may be utilized on either verticle or cross-split vehicle braking systems. One unit will accommodate all braking systems with minor internal changes. Finally, the system and assembly of the present invention provides an integrated adaptive braking and traction control system assembly having minimum size, weight, and cost.

I claim:

1. An integrated adaptive braking and traction control system assembly, comprising an elongated body having a mounting end and an axial bore extending from said mounting end, a master cylinder assembly operatively disposed in said bore, reservoir means communicating with said master cylinder assembly, pump means disposed adjacent the mounting end to communicate pressure toward wheel brakes of an associated vehicle, the elongated body including a plurality of valve devices of the adaptive braking and traction control system assembly, a plurality of displacement chambers with displacement pistons disposed therein, and a plurality of passages connecting together the valve devices, the master cylinder assembly with the wheel brakes via certain ones of the valve devices, the pump means with the displacement chambers, and the reservoir means with the master cylinder assembly, to provide the integrated adaptive braking and traction control system assembly for mounting on a vehicle.

2. The assembly in accordance with claim 1, wherein the mounting end is attached to a booster device.

3. The assembly in accordance with claim 2, wherein the booster device comprises one of a vacuum booster and a hydraulic booster.

4. The system in accordance with claim 3, wherein a plurality of pressure relief valves are disposed within passages communicating with said reservoir means.

5. The assembly in accordance with claim 4, wherein the pump means comprises a four-channel pump having associated pistons wherein each communicates pressure toward a respective wheel brake of the vehicle.

6. The assembly in accordance with claim 5, wherein each valve device of the plurality of valve devices comprises a three-way solenoid valve.

7. The assembly in accordance with claim 6, wherein the assembly further comprises two of said solenoid valves communicating with a respective fluid circuit for one of said wheel brakes of the vehicle.

8. The assembly in accordance with claim 7, wherein each chamber of the master cylinder assembly communicates with a brake of an associated pair of brakes via a solenoid valve comprising an isolation and decay three-way solenoid valve.

9. The assembly in accordance with claim 8, wherein each isolation and decay three-way solenoid valve includes an actuated position in order to isolate the master cylinder assembly from fluid communication with the associated brake and communicate the associated brake with the associated displacement piston and displacement chamber.

10. The assembly in accordance with claim 9, wherein each channel of said four-channel pump communicates with the associated displacement piston and a solenoid valve comprising a build three-way solenoid valve.

11. The assembly in accordance with claim 10, wherein each build three-way solenoid valve normally communicates the associated displacement chamber with said reservoir means and in an actuated position communicates the associated displacement chamber with the associated brake.

12. The assembly in accordance with claim 11, further comprising fluid flow restriction means disposed between a respective displacement chamber and build three-way solenoid valve.

13. A braking control system, comprising master cylinder means for transmitting pressurized fluid to at least one wheel brake of a vehicle, isolation and decay valve means disposed between said master cylinder means and wheel brake, reservoir means for providing fluid to said master cylinder means, pump means which communicates with said reservoir means and transmits fluid pressure to a displacement chamber having therein a displacement piston, one part of said displacement chamber communicating with build valve means, the build valve means communicating selectively with the reservoir means and the wheel brake, another part of the displacement chamber communicating with the isolation and decay valve means, and control means for controlling operation of said isolation and decay and build valve means, so that fluid pressure transmitted by the pump means is received within the one part of the displacement chamber and transmitted to said build valve means where the fluid pressure is transmitted to one of the reservoir means and said wheel brake, the other part of the displacement chamber able to transmit pressure, via displacement of the piston, toward the wheel brake via the isolation and decay valve means.

14. The control system in accordance with claim 13, wherein resilient means biases the piston within the displacement chamber.

15. The control system in accordance with claim 14, wherein the piston includes a through opening having therein piston valve means, the piston valve means closing in a flow direction toward said isolation and decay valve means and able to open in a flow direction toward said pump means.

16. The control system in accordance with claim 15, wherein said system further includes a pressure relief line communicating the pump means with said reservoir means via relief valve means.

17. The control system in accordance with claim 16, further comprising fluid flow restriction means disposed between said displacement chamber and isolation and decay valve means.

18. The control system in accordance with claim 17, further comprising fluid restriction means disposed between said pump means and displacement chamber.

19. The control system in accordance with claim 18, further comprising fluid flow restriction means disposed between said displacement chamber and build valve means.

20. The control system in accordance with claim 19, wherein the control means operates said system to effect traction control.

21. The braking control system in accordance with claim 13, further comprising an elongated body containing therein the master cylinder means, isolation and decay valve means, a portion of the pump means, the displacement chamber and displacement piston, and build valve means.

22. The braking control system in accordance with claim 21, wherein the elongated body contains a plurality of passages which communicate the pump means with the reservoir means and displacement chamber, the build valve means with the reservoir means and wheel brake, and the displacement chamber with the isolation and decay valve means, to provide an integrated control system assembly for mounting on a vehicle.

* * * * *